US009477114B2

(12) United States Patent
Chen

(10) Patent No.: US 9,477,114 B2
(45) Date of Patent: Oct. 25, 2016

(54) DIRECT TYPE BACKLIGHT MODULE AND LIQUID CRYSTAL DISPLAY DEVICE HAVING SAME

(71) Applicant: HON HAI PRECISION INDUSTRY CO., LTD., New Taipei (TW)

(72) Inventor: Po-Chou Chen, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 325 days.

(21) Appl. No.: 14/097,559

(22) Filed: Dec. 5, 2013

(65) Prior Publication Data

US 2015/0062487 A1 Mar. 5, 2015

(30) Foreign Application Priority Data

Aug. 30, 2013 (TW) ............................ 102131197 A

(51) Int. Cl.
*G02F 1/1335* (2006.01)

(52) U.S. Cl.
CPC ... *G02F 1/133602* (2013.01); *G02F 1/133606* (2013.01); *G02F 2001/133607* (2013.01); *G02F 2001/133614* (2013.01)

(58) Field of Classification Search
CPC ............ G02F 1/133602; G02F 2001/133607; G02F 2001/133614; G02F 2001/133606; G02F 1/133603; G02B 6/0068
See application file for complete search history.

(56) References Cited

U.S. PATENT DOCUMENTS 7,229,198 B2 * 6/2007 Sakai .................. G02B 6/0096 362/225
7,798,660 B2 * 9/2010 Itoh ..................... G02B 6/0028 349/96
7,815,355 B2 * 10/2010 Thompson ........... G02B 6/0028 362/560
7,859,610 B2 * 12/2010 Mizushima .......... G02B 6/0035 349/61
8,770,773 B2 * 7/2014 Yoshida ............ G02F 1/133617 362/235
8,979,344 B2 * 3/2015 Chen .................... G02B 6/0035 362/609
9,140,904 B2 * 9/2015 Chen .................... G02B 27/102
2008/0247150 A1 10/2008 Itoh et al.
2010/0220261 A1 * 9/2010 Mizushima .......... G02B 6/0035 349/64
2013/0039029 A1 * 2/2013 Wang .................. G02B 6/0035 362/19
2014/0177273 A1 * 6/2014 Chen .................... G02B 6/0035 362/609

FOREIGN PATENT DOCUMENTS

CN 101360948 A 2/2009
TW 201106061 A 2/2011

OTHER PUBLICATIONS

TW Office Action.

* cited by examiner

*Primary Examiner* — Dennis Y Kim
(74) *Attorney, Agent, or Firm* — Zhigang Ma

(57) ABSTRACT

A direct type backlight module includes an optical film unit and a light emitting unit. The light emitting unit includes a laser sources, transreflective components, reflective components, and phosphors. Each laser source corresponds to a number of the transreflective components and one of the reflective components arranged at an optical path of a laser beam emitted from the laser source in sequence. The transreflective component transmits part of the irradiated laser beam and reflects the other part of the laser beam. The reflective component reflects the irradiated laser beam. The phosphors correspond to the transreflective components and the reflective components one-to-one and emit out white light when irradiated by the laser beam reflected by the transreflective components and the reflective components. The white light transmits through the optical film unit.

16 Claims, 2 Drawing Sheets

DIRECT TYPE BACKLIGHT MODULE AND LIQUID CRYSTAL DISPLAY DEVICE HAVING SAME

BACKGROUND

1. Technical Field

The present disclosure relates to a liquid crystal display (LCD) device and a direct type backlight module used in the LCD device.

2. Description of Related Art

A LCD device usually includes a backlight module and a LCD panel. The backlight module includes a direct type backlight module and a side type backlight module. The direct type backlight module includes a number of light sources arranged in an array below an LCD panel and typically needs more light sources than the side type backlight module. Thus, the cost of the direct type backlight module is high.

Therefore, it is desirable to provide a direct type backlight module and a LCD device which can overcome the shortcomings mentioned above.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
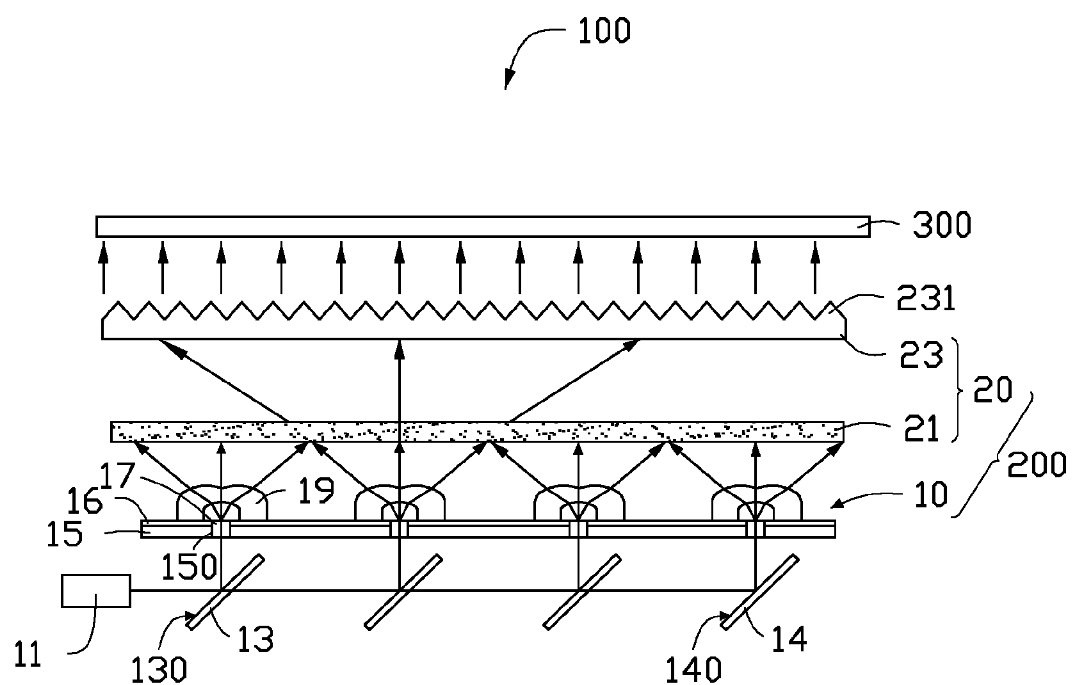
FIG. 1 is a schematic view of an LCD device according to an exemplary embodiment of the present disclosure, the LCD device including a light emitting unit.
Figure 2:
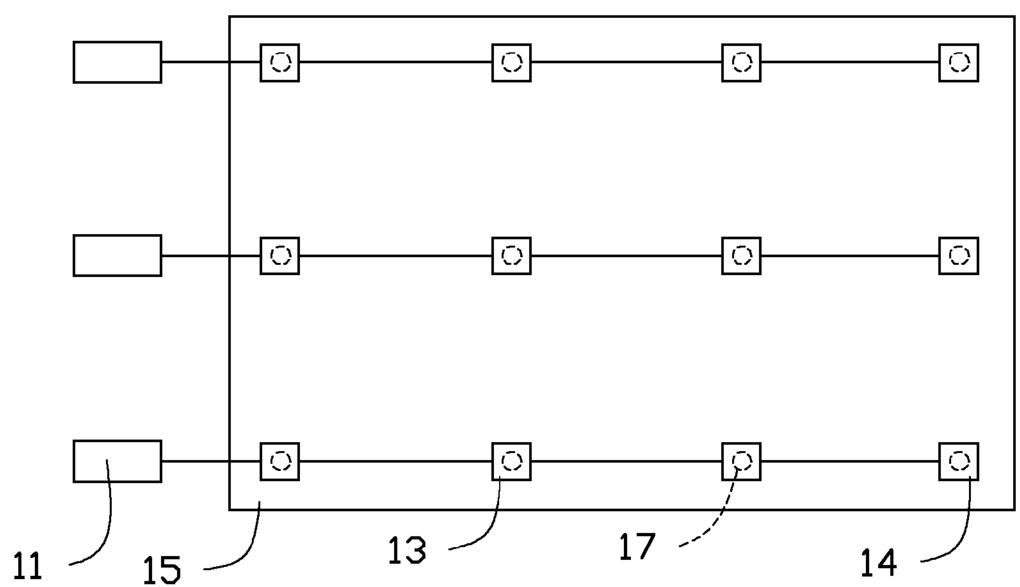
FIG. 2 is a schematic, bottom view of the light emitting unit of FIG. 1.

FIGS. 1 and 2 show a liquid crystal display (LCD) device 100 of an illustrated embodiment. The LCD device 100 includes a direct type backlight module 200 and a LCD panel 300.

The direct type backlight module 200 includes a light emitting unit 10 and an optical film unit 20 located above the light emitting unit 10. The LCD panel 300 is located above the optical film unit 20.

The light emitting unit 10 includes a number of laser sources 11, a number of transreflective components 13, a number of reflective components 14, a base plate 15, a reflective piece 16, a number of phosphors 17 and a number of secondary optical lenses 19.

In this embodiment, the laser sources 11 are blue laser sources and are spaced from each other.

Each of the laser sources 11 corresponds to the number of the transreflective components 13 and one of the reflective components 14 arranged in sequence along an optical path of a laser emitted by the laser source 11.

The transreflective component 13 transmits part of irradiated laser and reflects other parts of the laser. Along a direction away from the laser source 11, transmission coefficients of the number of the transreflective components 13 gradually decrease, and reflective coefficients of the number of the transreflective components 13 gradually increase. In this embodiment, each laser source 11 corresponds to three transreflective components 13. Along the direction away from the laser source 11, the transmission coefficient of the first transreflective component 13 is about 75%, the reflective coefficient of the first transreflective component 13 is about 25%. The transmission coefficient of the second transreflective component 13 is about 66.66%, the reflective coefficient of the second transreflective component 13 is about 33.33%. The transmission coefficient of the third transreflective component 13 is about 50%, the reflective coefficient of the first transreflective component 13 is about 50%.

The reflective component 14 is away from the laser source 11 relative to the transreflective components 13. The reflective component 14 theoretically reflects all of irradiated laser.

The transreflective components 13 include transreflective surfaces 130. The reflective component 14 includes a reflective surface 140. The transreflective surfaces 130 and the reflective surface 140 are tilted relative to the laser emitted from the laser source 11, deflecting the laser reflected by the transreflective surfaces 130 and the reflective surface 140. In this embodiment, included angles between the transreflective surfaces 130 and the laser emitted from the light source 11 are 45 degrees, and an included angle between the reflective surface 140 and the laser emitted from the light source 11 is 45 degrees.

Each phosphor 17 corresponds to one transreflective component 13 or the reflective component 14, and is located at an optical path of the laser reflected by the transreflective component 13 or the reflective component 14. In this embodiment, the base plate 15 defines a number of through holes 150 arranged in an array, and the phosphors 17 fill in the through holes 150. The phosphors 17 emit white light when irradiated by the laser. In this embodiment, the phosphors 17 are yellow phosphors.

The secondary optical lenses 19 are mounted on the base plate 15 and cover the through holes 150. Each secondary optical lens 19 corresponds to one phosphor 17. The second optical lens 19 increases a divergence angle of the white light emitted by the phosphor 17, expanding the white light to an area.

The white light transmitted through the secondary optical lenses 18 irradiates the optical film unit 20. In this embodiment, the optical film unit 20 includes a diffusion film 21 and a brightness enhancing film 23 both made of transparent resin. Diffusion particles are scattered in the diffusion film 21. The white light is mixed in the diffusion film 21 to be evenly distributed. The brightness enhancing film 23 includes a number of micro-prism structures 231. In this embodiment, the micro-prism structures 231 are V shaped strips. The brightness enhancing film 23 changes a transmission direction of the white light to a direction perpendicular to the brightness enhancing film 23 thus enhancing a forward brightness of the LCD device 100. The white light transmitted through the optical film unit 20 irradiates the LCD panel 300.

The reflective piece 16 is mounted on the base plate 15 and faces the optical film unit 20. The reflective piece 16 reflects light from the optical film unit 20 back to the optical film unit 20 to increase the usage ratio of the light.

The present disclosure includes a number of transreflective components and a reflective component to divide a laser beam from a laser source into a number of laser beams. Thus, the number of the laser sources needed in the LCD device can be reduced and the cost of the LCD device can be reduced.

It will be understood that the above particular embodiments are shown and described by way of illustration only.

The principles and the features of the present disclosure may be employed in various and numerous embodiments thereof without departing from the scope of the disclosure. The above-described embodiments illustrate the scope of the disclosure but do not restrict the scope of the disclosure.

What is claimed is:

1. A direct type backlight module comprising:

an optical film unit; and a light emitting unit comprising:

a plurality of laser sources;

a plurality of transreflective components;

a plurality of reflective components; and a plurality of phosphors; wherein each laser source corresponds to more than one of the transreflective components and one of the reflective components arranged at an optical path of a laser beam emitted from the laser source in sequence, the transreflective components transmit part of the laser beam irradiated thereof and reflect the other part of the laser beam, the reflective component reflects the laser beam irradiated thereof, the phosphors correspond to the transreflective components and the reflective components one-to-one and emit white light when irradiated by the laser beam reflected by the transreflective components and the reflective components, the white light transmits through the optical film unit.

2. The direct type backlight module of claim 1, wherein the light emitting unit further comprises a plurality of secondary optical lenses corresponding to the phosphors one-to-one, the secondary optical lenses are located at the optical path of the white light to increase a divergence angle of the white light.

3. The direct type backlight module of claim 2, wherein the light emitting unit further comprises a base plate defining a plurality of through holes, the phosphors fill the through holes, the secondary optical lenses are mounted on the base plate and cover the through holes.

4. The direct type backlight module of claim 3, wherein the light emitting unit further comprising a reflective piece mounted on the base plate and facing the optical film unit.

5. The direct type backlight module of claim 1, wherein along a direction away from the light sources, transmission coefficients of the transreflective components gradually decrease, and reflective coefficients of the transreflective components gradually increase.

6. The direct type backlight module of claim 1, wherein the laser sources are blue laser sources, and the phosphors are yellow phosphors.

7. The direct type backlight module of claim 1, wherein the transreflective components comprise transreflective surfaces tilted relative to the laser beam irradiating the transreflective components, and the reflective components comprise reflective surfaces tilted relative to the laser beam irradiating the reflective components.

8. The direct type backlight module of claim 7, wherein included angles between the transreflective surfaces and the laser beam irradiating the transreflective components are 45 degrees, and included angles between the reflective surfaces and the laser beam irradiating the reflective components are 45 degrees.

9. A liquid crystal display (LCD) device comprising:

a LCD panel; and a direct type backlight module comprising:

an optical film unit; and a light emitting unit comprising:

a plurality of laser sources;

a plurality of transreflective components;

a plurality of reflective components; and a plurality of phosphors; wherein each laser source corresponds to more than one of the transreflective components and one of the reflective components arranged at an optical path of a laser beam emitted from the laser source in sequence, the transreflective components transmit part of the laser beam irradiated thereof and reflect the other part of the laser beam, the reflective component reflects the laser beam irradiated thereof, the phosphors correspond to the transreflective components and the reflective components one-to-one and emit white light when irradiated by the laser beam reflected by the transreflective components and the reflective components, the white light transmits through the optical film unit and irradiate the LCD panel.

10. The LCD device of claim 9, wherein the light emitting unit further comprises a plurality of secondary optical lenses corresponding to the phosphors one-to-one, the secondary optical lenses are located at the optical path of the white light to increase a divergence angle of the white light.

11. The LCD device of claim 10, wherein the light emitting unit further comprises a base plate defining a plurality of through holes, the phosphors fill the through holes, the secondary optical lenses are mounted on the base plate and cover the through holes.

12. The LCD device of claim 11, wherein the light emitting unit further comprising a reflective piece mounted on the base plate and facing the optical film unit.

13. The LCD device of claim 9, wherein along a direction away from the light sources, transmission coefficients of the transreflective components gradually decrease, and reflective coefficients of the transreflective components gradually increase.

14. The LCD device of claim 9, wherein the laser sources are blue laser sources, and the phosphors are yellow phosphors.

15. The LCD device of claim 9, wherein the transreflective components comprise transreflective surfaces tilted relative to the laser beam irradiating the transreflective components, and the reflective components comprise reflective surfaces tilted relative to the laser beam irradiating the reflective components.

16. The LCD device of claim 15, wherein included angles between the transreflective surfaces and the laser beam irradiating the transreflective components are 45 degrees, and included angles between the reflective surfaces and the laser beam irradiating the reflective components are 45 degrees.

* * * * *